United States Patent [19]
Hosokawa

[11] Patent Number: 5,408,354
[45] Date of Patent: Apr. 18, 1995

[54] OPTICAL ISOLATOR

[75] Inventor: Tadatoshi Hosokawa, Kumagaya, Japan

[73] Assignee: Chichibu Cement Co., Ltd., Tokyo, Japan

[21] Appl. No.: 17,784

[22] Filed: Feb. 16, 1993

[30] Foreign Application Priority Data

Feb. 17, 1992 [JP] Japan ................... 4-079386

[51] Int. Cl.$^6$ ............ G02F 1/09; G02B 27/28; G02B 5/30
[52] U.S. Cl. ................... 359/281; 359/484; 359/495; 359/497
[58] Field of Search ............ 359/484, 494, 495, 496, 359/497, 501, 281

[56] References Cited

U.S. PATENT DOCUMENTS

| | | | |
|---|---|---|---|
| 4,239,329 | 12/1980 | Matsumoto | 359/484 |
| 4,375,910 | 3/1983 | Seki | 359/484 |
| 4,712,880 | 12/1987 | Shirasaki | 359/484 |
| 5,029,988 | 7/1991 | Urino | 359/484 |
| 5,033,828 | 7/1991 | Haruta | 359/484 |
| 5,052,786 | 10/1991 | Schulz | 359/484 |
| 5,267,078 | 11/1993 | Shiraishi et al. | 359/484 X |

FOREIGN PATENT DOCUMENTS

| | | |
|---|---|---|
| 0415444 | 6/1991 | European Pat. Off. . |
| 0492437 | 1/1992 | European Pat. Off. . |
| 22026 | 2/1984 | Japan ............ 359/484 |
| 260019 | 9/1992 | Japan ............ 359/484 |

Primary Examiner—Edward K. Look
Assistant Examiner—Michael S. Lee
Attorney, Agent, or Firm—Zarley, McKee, Thomte, Voorhees & Sease

[57] ABSTRACT

An optical isolator according to the invention comprises a first birefringent element for separating an incident light beam into two light beams that are vertical to each other in the polarization direction and are not parallel with each other in the propagation direction, a 45° Faraday rotator, a second birefringent element that is identical with the first birefringent element in terms of the light beam-separation angle but is different by 45° from the first polarizer in terms of the angle the separated two light beams make to the polarization of the beams, and at least one birefringent crystal plane plate that has a function capable of converging two parallel light beams, with the planes of polarization at right angles with each other, into a single beam.

3 Claims, 2 Drawing Sheets

OPTICAL ISOLATOR

BACKGROUND OF THE INVENTION

The present invention relates to a plane-of-polarization independent type of optical isolator that is used for optical communications and photometry.

There have heretofore been two types of optical isolators which may be disposed between a transmitting optical fiber and a receiving optical fiber to operate on a plane of polarization and every orientation, one being the type which uses a birefringent crystal planar plate as a polarizer and the other being the type using a birefringent crystal wedge as a polarizer.

However, a serious problem with the type using a birefringent crystal plane plate is that its thickness must be increased, making an optical device unavoidably large. The reason is that the returning light appears in the form of a light beam parallel with the forward light, and so an inter-light beam space must be increased so as to prevent the backward light from coming back to the optical fiber.

The type using a birefringent crystal wedge, on the other hand, presents another serious problem. That is, the backward light appears in the form of a light beam that is at an angle to, rather than parallel with, the forward light, so that the prevention of the returning light can be somehow achieved by making the wedge angle large and thereby allowing the light beam of the returning light to make a large angle to the forward light. However, because the forward light leaves the optical isolator while it is divided into two light beams, there is needed a special optical system for condensing both of two such light beams on one optical fiber.

An object of the invention is therefore to provide a plane-of-polarization independent type of optical isolator that has increased isolation but much reduced light loss due to insertion.

SUMMARY OF THE INVENTION

According to the invention, the object mentioned above is achieved, if the backward light becomes a light beam that is at an angle to, rather than parallel with, the forward direction and the forward light becomes a single light beam.

To be more specific, the invention provides an optical isolator made up of a first birefringent element for separating an incident light beam into two light beams that are perpendicular to each other in the polarization direction and are not parallel with each other in the propagation direction, a 45° Faraday rotator, a second birefringent element that is identical with the first birefringent elements in terms of the light beam-separation angle but is different by 45° from the first birefringent element in terms of the angle the separated two light beams make to the polarization of the beams, and at least one birefringent crystal plane plate that has a function capable of converging two parallel light beams, with the planes of polarization at right angles to each other, into a single beam.

Preferably, the invention provides an in-line type of optical isolator equipment which, in addition to the isolator mentioned just above, includes a lens for guiding the light leaving the optical fiber to an inlet in an optical fiber for photometry.

Preferably, the first and second birefringent elements are crystal wedge Wollaston or Rochon prisms.

BRIEF DESCRIPTION OF THE DRAWINGS

The present invention will now be explained, by way of example but not by way of limitation, with reference to the accompanying drawings, in which.

DETAILED DESCRIPTION OF THE PREFERRED EMBODIMENTS

Figure 1:
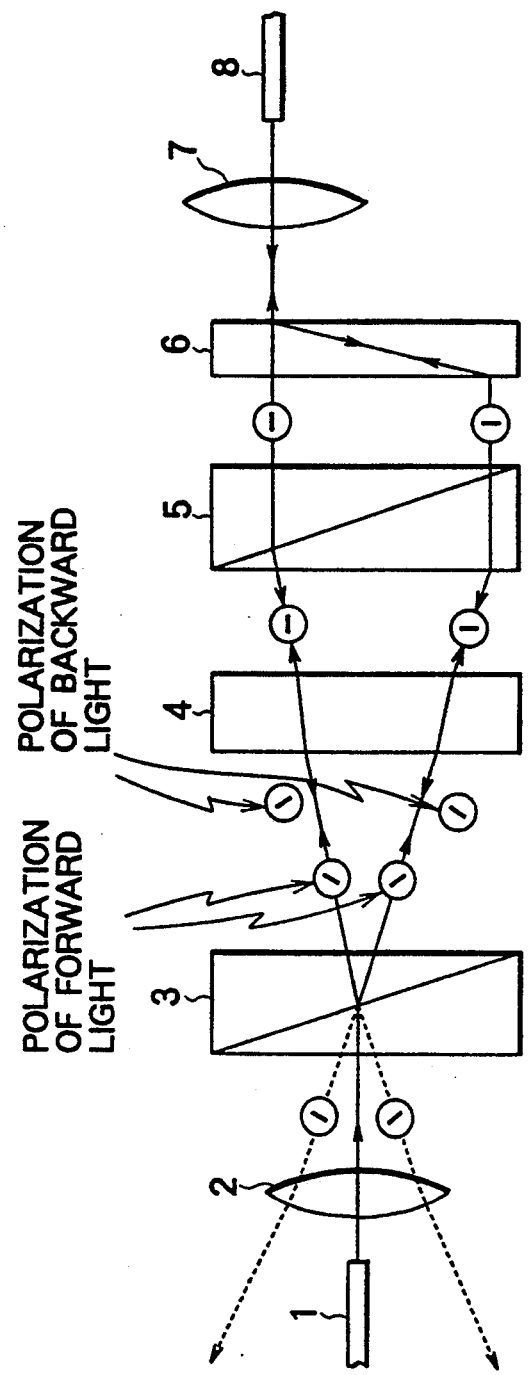
FIG. 1 is an illustrative representation of the construction of the invention.
Figure 2:
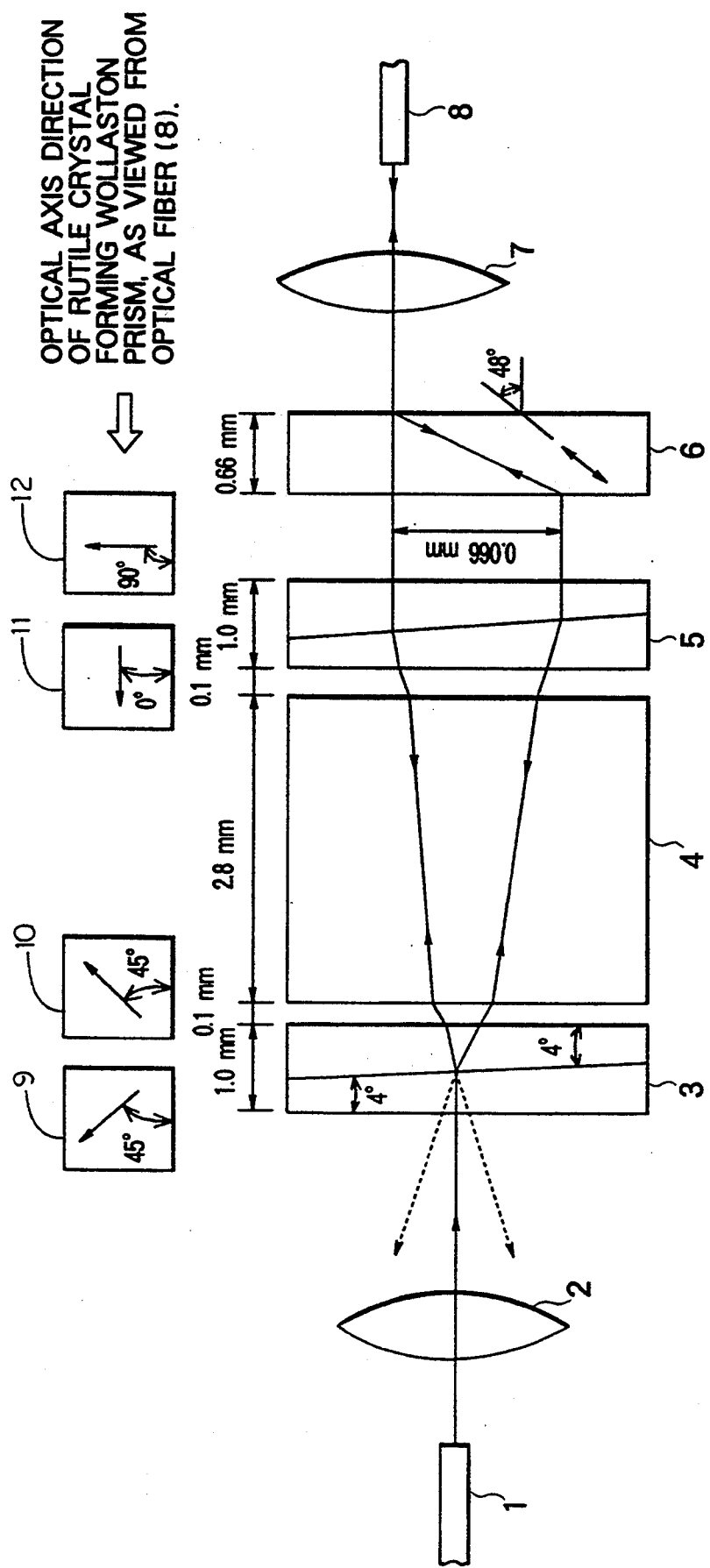
FIG. 2 is a side view of one specific embodiment of the invention.

Referring now to FIG. 1, the light leaving an optical fiber 1 through its exit is converted by a lens 2 into a light beam that is approximate to a parallel beam, and then enters a first birefringent element 3. For this birefringent element 3, a Wollaston or Rochon prism built up of two birefringent crystal prism elements may be used.

The light beam, incident on the first birefringent element 3, passes through the first birefringent element 3, whence it propagates in the form of two light beams that are at an angle to, rather than parallel with, each other. This angle is here called the separation angle, and is determined by the prism angle of the prism forming the birefringent element, the type of crystal and the orientation of crystal axes.

The two light beams are respectively polarized, with the planes of polarization being determined depending on the direction of the optic axis of crystals forming the prism.

Upon leaving the first birefringent element 3, the light beams pass through a 45° Faraday rotator 4 and enter a second birefringent element 5.

For the second birefringent element 5, a Wollaston or Rochon prism may be used, as in the case of the first birefringent element 3. The light beam-separation angle of the second birefringent element 5 equals that of the first birefringent element 3, but differs by 45° from the first birefringent element in the angle that the plane defined by the two light beams makes to the planes of polarization thereof. The light passing through this second birefringent element becomes two light beams that are parallel with each other.

According to the invention, in order to reduce light loss due to insertion of an optical isolator, a birefringent crystal plane plate 6 is located in the rear of the second birefringent element 5, so that, by passing through this plane plate, the two polarized beams can be converged into a single light beam, which is then guided through a lens 7 to an optical fiber 8. It is here to be noted that it is not always required for this lens 7 to have a function capable of condensing all the light energy of the two parallel beams into a completely single point.

The optical isolator set up as mentioned above works as follows. As the light leaving the optical fiber 1 is converted by the lens 2 into light beams that are approximate to parallel beams and enters the first birefringent element 3, the light leaves the first birefringent element 3 in the form of two light beams with the planes of polarization perpendicular to each other. The angle these two beams make to each other, when a Wollaston prism is used as the first birefringent element, is twice as large as that achieved with a conventional wedge form of birefringent crystal.

Then, the light beams pass through the 45° Faraday rotator 4, whereby they are rotated 45° in terms of their planes of polarization.

The second birefringent element 5 is made equal to the first birefringent element 3 in terms of the polarization-separation angle of the two linear light beams, with the planes of polarization turned 45°. In order to fabricate such a birefringent element with the use of a Wollaston prism, for instance, its prism angles are made equal to each other, with the crystal axis of the crystal forming the prism turned 45° with respect to the first birefringent element.

The use of the second birefringent element 5 of such nature enables the light passing through it to provide two polarized light beams that are parallel with each other.

In order to guide the two beams to a single optical fiber 8, it is preferable that the inter-beam space should be narrowed as much as possible. More preferably, the two beams should be in the form of a single beam. To this end, a birefringent crystal plane plate 6 is used.

In order to make the centers of the two light beams, with the planes of polarization perpendicular to each other, in agreement with each other, it is desirable that they be passed through a birefringent crystal plane plate, i.e., a so-called Savart plate selected depending on the spacing between the two light beams.

When a plane including two beams is parallel with or perpendicular to the planes of polarization, it needs to use only one birefringent crystal plane plate. If it is neither parallel with, nor perpendicular to the planes of polarization, it is preferable to use two birefringent crystal plane plates.

The light, which has passed through the birefringent crystal plane (Savart) plate and so again taken on the form of a single beam, is guided through a lens 7 to the optical fiber 8.

It is understood that one of the first and second lenses 2 and 7 may be done without, with the proviso that the other can be used to guide the light leaving the optical fiber 1 to the optical fiber 8.

On the other hand, the backward light leaving the optical fiber 8 is converted by the birefringent crystal plane plate 6 into two light beams with the planes of polarization perpendicular to each other. Then, they enter the second birefringent element 5 through the same path taken by the incident light, whence they pass through the same path and enter the 45° Faraday rotator 4. It is understood that the planes of polarization of the backward light beams are identical with those of the forward light beams until they enter the 45° Faraday rotator 4. The plane of polarization of the light leaving the 45° Faraday rotator 4 is turned 90° in comparison with the case of the incident light.

When the light, that is identical with the incident light in terms of the light beam angle and has a 90° turned plane of polarization, goes back to the first birefringent element 3, it becomes two polarized beams, rather than a single beam, and is different in angle from the incident light beam. When the first birefringent element 3 comprises a Wollaston prism, the angle at which the backward traveling light beams intersect with the incident light beam, that is, the forward traveling light beam will be twice as large as that would be obtained with a wedge form of birefringent crystal. Hence, the backward light is less likely to return to the optical fiber 1, when compared with a wedge type birefringent element, making it possible to make an isolator of high isolation.

If a device is located at a position at which the backward light beam does not enter the optical fiber 1, it can then be used as an in-line type of plane-of-polarization independent isolator that is inserted somewhere in an optical fiber for use.

According to the invention, it is thus possible to make the angles of the two beams of the returning light twice as large as that would be obtained with an optical isolator making use of a wedge form of birefringent crystal, because Wollaston prisms are used for the first and second birefringent elements. This in turn enables not only isolation to be much more increased but also the optical fiber to be located much closer to the first birefringent element 3, making compactness achievable. In addition, the birefringent crystal plane plate 6 is located in the vicinity of the optical fiber 8 to enable light to be much more condensed on the optical fiber 8, thereby making light loss due to insertion smaller.

While the invention has been described with reference to an example in which Wollaston prisms are used for the first and second birefringent elements, it is understood that the invention can equally be embodied, even with Rochon prisms.

The invention will now be explained at great length with reference to its more specific embodiment.

The first birefringent element 3 used is made up of a rutile Wollaston prism of 1 mm in thickness. The prism angle is 4 degrees. The refractive indices of rutile are 2.451 for No and 2.709 for Ne, as measured at the wavelength of 1.53 $\mu$m. The upper block diagram shows the direction of the c axis of the crystal axes. As can be best seen from this diagram, the directions of the c axis of the Wollaston prism are +45 degrees and −45 degrees, shown at 9 and 10, as viewed from the light-receiving side. The 45°. Faraday rotator 4 used is made up of a substance having a refractive index N of 2.25 and a thickness of 2.8 mm. The first birefringent element 3 is spaced 0.1-mm away from the 45° Faraday rotator 4, that is then spaced 0.1-mm away from the second birefringent element 5. The second birefringent element 5 is made up of a rutile Wollaston prism with the prism angle of 4 degrees. As shown at 11 and 12, the directions of the c axis of the Wollaston prism are 0 degree and 90 degrees, respectively.

As light enters the optical isolator of such construction and leaves the second birefringent element 5, there appear two light beams that are spaced 0,066 mm away from each other and polarized perpendicular to each other. These two beams pass through the birefringent crystal plane plate 6 of rutile, which they leave in the form of a single beam. This is because the plane plate 6 is located such that the directions of the axis of rutile is 48 degrees thereto, and has a thickness of 0.660 mm. This single beam can be efficiently condensed through the lens 7 on the optical fiber 8, so that the isolator can have much more reduced light loss due to insertion.

After the returning light leaves the Faraday rotator 4, the plane of polarization is rotated 90° to the forward light, so that the light, upon leaving the first birefringent element 3, can appear in the form of two polarized light beams, rather than a single beam. The angles made between the polarized light beams and the incident light beam are about 20 degrees.

This is about twice as large as that would be obtained by using a wedge type of birefringent crystal as a polarizer thus enabling the isolation of the optical isolator to be increased. Alternatively, the optical fiber 1 may be located closer to the first birefringent element 3, making compactness achievable.

As can be understood from what has been described, the present invention can provide a plane-of-polarization independent type of optical isolator that is of small size, of high isolation, and of low insertion loss, or in other words, high performance. The present invention may also be applied to an optical circulator.

What is claimed is:

1. An optical isolator disposed between a transmitting optical fiber for transmitting light therefrom and a receiving optical fiber for receiving light from the transmitting optical fiber, said optical isolator comprising:

a first birefringent element positioned to accept light traveling in a forward direction from said transmitting optical fiber and separate the light into two light beams, each having a direction of polarization and a direction of travel, that are perpendicular to each other in the direction of polarization of each and are not parallel to each other in the direction of travel of each, said first birefringent element having an axis of polarization in a first orientation;

a 45° Faraday rotator disposed to accept the forward traveling light from said first birefringent element and rotate the direction of polarization of said forward traveling light from said first orientation to a second orientation, said second orientation being at a first angle relative to said first orientation;

a second birefringent element positioned to accept the forward traveling light from said rotator, said second birefringent element being configured to be identical with said first birefringent element in terms of light beam separation angle but be different by 45° from the first birefringent element in terms of angle which the two separated light beams form with respect to the polarization of the beams; and characterized by an at least one birefringent crystal planar plate positioned to accept two parallel light beams of the forward traveling light having planes of polarization perpendicular to each other from said second birefringent element and having a function of condensing said two parallel light beams into a single beam which in turn is received into said receiving optical fiber, said at least one birefringent crystal planar plate accepting backward traveling light returning from said receiving optical fiber to convert the light into two light beams having planes of polarization perpendicular to each other.

2. The optical isolator according to claim 1 further comprising lens means for guiding the forward traveling light from said transmitting optical fiber into said receiving optical fiber.

3. The optical isolator according to claims 1 or 2 wherein each of said first and second birefringent elements comprises one of a Wollaston prism and a Rochon prism.

* * * * *